US006625384B1

(12) United States Patent
Kochale

(10) Patent No.: US 6,625,384 B1
(45) Date of Patent: Sep. 23, 2003

(54) METHOD FOR REPRODUCING CODED PICTURES OF DIFFERING RESOLUTION

(75) Inventor: Axel Kochale, Springe (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/487,048

(22) Filed: Jan. 19, 2000

(30) Foreign Application Priority Data

Feb. 8, 1999 (DE) .......................................... 199 04 987

(51) Int. Cl.⁷ ................................................. H04N 5/91
(52) U.S. Cl. ............................. 386/46; 386/95; 386/124
(58) Field of Search ............................... 386/46, 68, 52, 386/95, 55, 109, 111, 124, 125–126; H04N 5/91

(56) References Cited

U.S. PATENT DOCUMENTS

| 4,730,222 A | | 3/1988 | Schauffele ................... 358/310 |
| 4,939,586 A | * | 7/1990 | Nabati et al. ................ 386/125 |
| 5,241,659 A | * | 8/1993 | Parulski et al. .............. 386/126 |
| 5,448,372 A | * | 9/1995 | Axman et al. ................ 386/124 |

FOREIGN PATENT DOCUMENTS

| EP | 0-888-018 A1 | 12/1998 | ............ H04N/5/92 |
| JP | 8-172604 | 7/1996 | ............ H04N/5/92 |
| JP | 8-205084 | 8/1996 | ............ H04N/5/92 |
| JP | 9-51499 | 2/1997 | ............ H04N/5/91 |
| JP | 10-210410 | 8/1998 | ............ H04N/5/92 |

OTHER PUBLICATIONS

Search Report.

* cited by examiner

Primary Examiner—Vincent Boccio
(74) Attorney, Agent, or Firm—Joseph S. Tripoli; Harvey D. Fried; Francis A. Davenport

(57) ABSTRACT

A method for the reproduction of coded pictures. On a video CD, the video data for the PAL system are stored with a resolution of 352*288 pixels at a frame frequency of 25 Hz. The video data for still pictures can be stored either with this resolution or with an increased resolution of 704*576 for the PAL system. Consequently, depending on the specification, for still pictures on a video CD, there may also be a data stream having a mixed resolution in addition to a data stream having a standard resolution. According to the invention, a preliminary analysis is carried out in a first step. After the identification of pictures Nres having the first resolution, these pictures are either skipped or their contents are stored in a buffer. After the identification of pictures Hres having the second resolution, these are fed to a decoding stage. In the absence of pictures Hres having the second resolution, a jump is made back to the beginning of a picture Nres having the first resolution or the data are read from a buffer and fed to a decoding stage.

8 Claims, 1 Drawing Sheet

METHOD FOR REPRODUCING CODED PICTURES OF DIFFERING RESOLUTION

The invention relates to a method for the reproduction of pictures having different resolutions.

PRIOR ART

On a video CD, the video data for moving pictures are stored in a standard resolution, which, e.g. for the PAL system, is 352*288 pixels at a frame frequency of 25 Hz. The video data for still pictures can be stored either with this resolution or with an increased resolution of 704*576 for the PAL system. Consequently, depending on the specification, for still pictures on a video CD, there may also be a data stream having a mixed resolution in addition to a data stream having a standard resolution.

More detailed specifications regarding the stored data are stored in a separate list, which have to be read out during reproduction by a player. This process requires special manipulation by the player by means of suitable software.

SUMMARY OF THE INVENTION

The invention relates to a method for the reproduction of pictures having different resolutions.

The invention is achieved by means of the features specified in claim 1.

Advantageous developments are reproduced in the subclaims.

According to the invention, during the reproduction of pictures, in particular still pictures, a preliminary analysis is carried out which searches through the data stream present on a storage medium, e.g. a video CD or a magnetic recording medium, for different resolutions. Only so-called I frames are analysed in this case. These are coded pictures whose contents are based exclusively on the information in a picture. If an I frame having an increased resolution has been found, it is read immediately from the storage medium for further processing.

However, if only I frames having a standard resolution are found, two different decoding steps are afforded. On the one hand, a jump can be initiated back to the beginning of the I frame having a standard resolution or the data having a standard resolution are read out during the preliminary analysis and buffer-stored in a buffer.

Separate checking as to whether a still picture to be reproduced is stored with an increased resolution on the video CD is advantageously avoided by the inventive method. The method is preferably employed for displaying menu contents.

BRIEF DESCRIPTION OF THE DRAWINGS

Furthermore, an exemplary embodiment of the inventive method is described with reference to the drawings.

DETAILED DESCRIPTION

Figure 1:
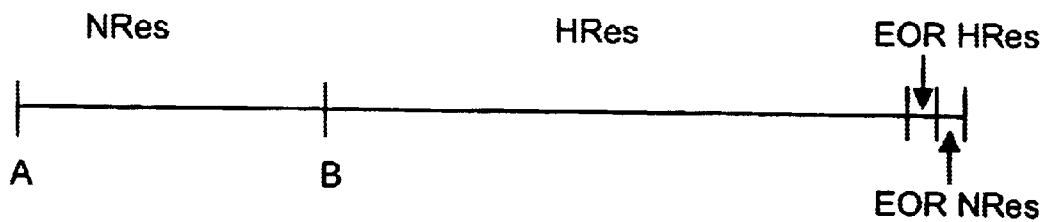
FIG. 1 shows a data stream of mixed resolution.
Figure 2:
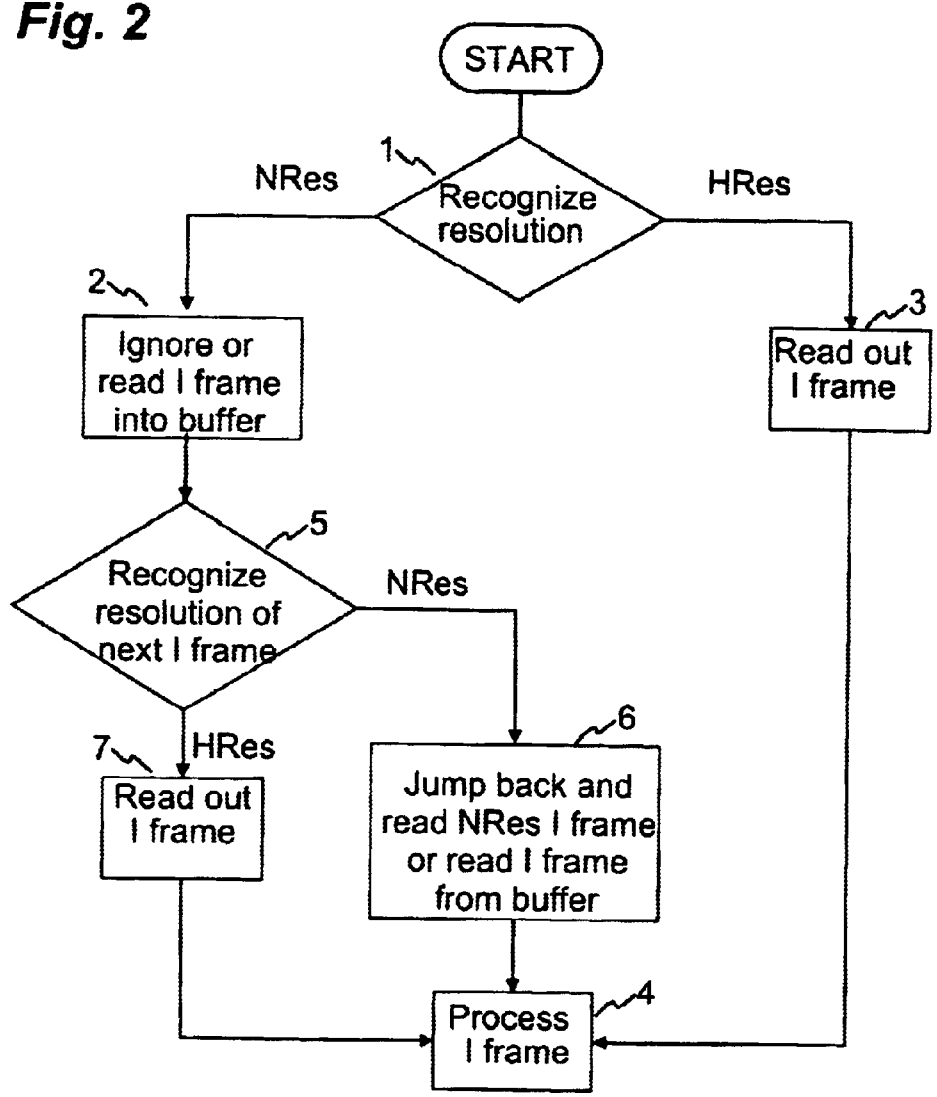
FIG. 2 shows a method for the reproduction of coded pictures according to the invention.

Furthermore, an exemplary embodiment of the inventive method is described with reference to the drawing.

FIG. 1 shows a data stream having a mixed resolution. An I frame having a standard resolution is illustrated in a first section NRes and an I frame having an increased resolution is illustrated in a second section HRes. It is also possible for sections having a plurality of successive I frames having a standard resolution, followed by a plurality of successive I frames having an increased resolution, to be stored on a video CD.

The conclusion of one or more I frames having an increased resolution is followed by one or more identification bytes EOR NRes, EOR HRes. Each I frame starts with an input code A, B, which identifies the type of the associated I frame. In the preliminary analysis mode, the system recognizes the type of the subsequent I frame at the input mode. If an I frame having a standard resolution is involved, it is either ignored or read into a buffer. If an I frame having an increased resolution is involved, it is read out for further processing. Should no I frame having an increased resolution follow the I frame having a standard resolution, either a jump is initiated back to the beginning of the I frame having the standard resolution or, if the desired I frame is stored in a buffer, it is read from the latter for further processing.

What is claimed is:

1. Method for the reproduction of coded pictures having a first resolution and a second resolution, comprising the steps of:

identifying pictures having said first resolution;

skipping said pictures identified with said first resolution;

determining pictures having said second resolution and supplying for decoding; and, jumping to a beginning of a picture having said first resolution and supplying this picture for decoding absent determining pictures having said second resolution.

2. Method according to claim 1, wherein said identifying step comprises;

evaluating input codes assigned to said coded pictures.

3. Method according to claim 1, wherein in said determining step said pictures determined to have said second resolution have an increased resolution relative to said pictures identified by said identifying step to have said first resolution.

4. Method according to claim 1, comprising the step of: reading said coded pictures from one of an optical and a magnetic store.

5. Method for the reproduction of coded pictures having a first resolution and a second resolution, comprising the steps of:

identifying pictures having said first resolution;

storing said pictures identified with said first resolution;

determining pictures having said second resolution and supplying for decoding; and, supplying said stored picture having said first resolution for decoding absent determining pictures having said second resolution.

6. Method according to claim 5, wherein said identifying step comprises;

evaluating input codes assigned to said coded pictures.

7. Method according to claim 5, wherein in said determining step said pictures determined to have said second resolution have an increased resolution relative to said pictures identified by said identifying step to have said first resolution.

8. Method according to claim 5, comprising the step of: reading said coded pictures from one of an optical and a magnetic store.

* * * * *